United States Patent [19]

Yamakami

[11] 3,863,016

[45] Jan. 28, 1975

[54] PROCESS FOR THE PREPARATION OF EDIBLE FIBERS WITH EXCELLENT MASTICABILITY

[75] Inventor: Yasumasa Yamakami, Sagamihara, Japan

[73] Assignee: The Nisshin Oil Mills, Ltd., Tokyo, Japan

[22] Filed: Nov. 22, 1972

[21] Appl. No.: 308,782

[30] Foreign Application Priority Data

Dec. 29, 1971  Japan............................ 46-3235

[52] U.S. Cl. ............................................... 426/276
[51] Int. Cl. .............................................. A23j 3/00
[58] Field of Search .................................... 426/276

[56] References Cited
UNITED STATES PATENTS

| 2,730,448 | 1/1956 | Boyer et al. ......................... 426/276 |
| 3,455,697 | 7/1969 | Atkinson.......................... 426/276 X |

*Primary Examiner*—James R. Hoffman
*Attorney, Agent, or Firm*—McGlew and Tuttle

[57] ABSTRACT

In a process for the preparation of edible protein fibers an alkali-peptized dope of soybean proteins is extruded through fine holes into a coagulating bath and the spun fibers are neutralized, the spinning is carried out at a low temperature while applying tension. The neutralization of the thus spun fibers is performed by hot water containing a buffer agent or by an alkaline salt slightly soluble or insoluble in water.

3 Claims, No Drawings

3,863,016

PROCESS FOR THE PREPARATION OF EDIBLE FIBERS WITH EXCELLENT MASTICABILITY

BACKGROUND OF THE INVENTION

1. Field of the Invention

The present invention relates to edible soybean protein fibers with excellent masticability which closely resembles the chewiness of natural meats and to a process for the preparation of said edible fibers.

2. Prior Art

The processes for the preparation of soybean protein fibers in the prior art include the steps of (1) peptizing a protein curd extracted and isolated from soybean materials or defatted soybeans with water and an alkaline material to obtain a spinning dope having a protein content of 10 to 15 percent by weight and a pH of 11.5 to 13.0, (2) extruding the so-obtained spinning dope through fine holes into a coagulating bath composed of an acid-salt solution at normal temperature to form protein fibers, and (3) if desired, stretching same, and (4) then neutralizing the fibers at normal temperature the fibers with an alkaline material to a pH acceptable for use in foods, namely, in the range of from 5.5 to 6.5. The thus obtained fibers have an elongation which is within the range of 150 to 250 percent and become fragmentary when chewed and it is difficult to swallow them. Furthermore, such fibers are inferior in flavor and have chewiness characteristics which are quite different from that of natural meats.

OBJECTS OF THE INVENTION

An object of the present invention is to provide a process for the preparation of edible protein fibers with high elasticity and excellent masticability.

Another object of the present invention is to provide meat-like foodstuffs made of protein fibers which closely resemble natural meats as to chewiness and flavor.

SUMMARY OF THE INVENTION

In a process for the preparation of edible protein fibers comprising the steps of producing a spinning dope from an alkali-peptized solution of soybean proteins by conventional methods, extruding said spinning dope through fine holes into an acid-salt coagulating bath and neutralizing the resulting fibers, the improvement according to the present invention comprises spinning, said fibers in a coagulating bath having a temperature of about 10°C or less under a drawing tension of at least about 150 percent and carrying out the neutralization of the thus spun fibers thus spun with hot water at a temperature above about 60°C, said water containing a buffer agent which exhibits buffer action in a pH area of from about 5.0 to about 6.5 or an alkaline salt slightly soluble or insoluble in water.

Meat-like foodstuffs made of protein fibers according to the present invention are remarkably improved in chewiness and masticability as compared with those obtained by the methods known in the art.

DETAILED DESCRIPTION

As mentioned above, the characteristic feature of the present invention lies in the combination of low temperature-coagulation with high temperature-neutralization. The larger the temperature difference between both steps, the more noticeable the effects of the present invention. Furthermore, the spinning is carried out in the coagulating bath at a temperature below about 10°C under drawing tension of at least about 150 percent so that fibers with high elasticity are obtained. The elasticity of fibers is closely connected with chewiness and masticability. The higher the elasticity, the more excellent the chewiness and masticability. When temperature of the coagulating bath is above 10°C, the so obtained fibers are inferior in elongation so that the desired purpose can not be attained.

The elongation of fibers obtained by conventional methods is below 250 percent, while the fibers treated in the temperature ranges according to the present invention have an elongation of 300 to 600 percent so that the properties of the fibers could be remarkably improved. It has been found that the step of neutralizing the fibers at such high a temperature as exceeds about 60°C can let the fibers have elasticity, and further has the advantages that the neutralization can be performed evenly between fibers tows and in the inside of fibers, and moreover that the flavor of fibers can be improved.

Besides the step of effecting the neutralization of fibers under a high temperature, the present invention is also characterized by using a buffer agent exhibiting buffer action in a pH area of about 5.0 to 6.5 or an alkaline salt slightly soluble or insoluble in water as a neutralizing agent. As examples of the buffer agent exhibiting the buffer action in a pH area of about 5.0 to 6.5 there are indicated citric acid sodium citrate, acetic acid-sodium acetate, phosphoric acid-sodium phosphate and the like. A concentration of an aqueous solution of the buffer agent is preferably about 2 to 5 percent by weight. As examples of the alkaline salt which is slightly soluble or insoluble in water there are indicated calcium carbonate, magnesium carbonate and the like.

It was customary in the past to carry out the neutralization of fibers with a salt solution containing an alkaline material such as hydroxides of alkali metals and sodium hydrogen carbonate. However, when the high temperature-neutralization according to the present invention was carried out with such an alkaline material, the protein fibers became swollen and dissolved and dissolve in the alkaline material so that the neutralization was inoperative in practice. According to the present invention, however, the neutralizing agent, even when used at a high temperature does not cause the fibers to swell or dissolve and moreover, there is the advantage that a concentration control of the neutralizing agent is easily done, i.e., the neutralization can be performed in a stable manner within a broad range of concentration of the neutralizing agent.

The following examples are indicated for the purpose of illustration only and are not to be construed as placing any limitation on the scope of the present invention.

EXAMPLE 1

An alkaline spinning dope of soybean protein obtained by the conventional methods, having a protein content of 14.8 percent, a pH of 12.5 and a viscosity of 12,000 cps (at 40°C) was extruded through fine holes of 0.1mm in diameter into a coagulating bath composed of a mixture of 5 percent by weight acetic acid and 10 percent by weight sodium chloride under drawing tension of 250 percent and spun.

The temperature of the coagulating bath was 4°C. The pH of the fibers thus obtained was 2.5. Immediately thereafter, the fibers were neutralized with an aqueous solution containing 4 percent by weight citric acid-sodium citrate and having a pH of 6.0 at a temperature of 80°C while heating for 20 seconds. The pH of the fibers so obtained was 6.0 evenly between fiber tows and in the inside of the fibers.

Results of organoleptic tests on the fibers obtained in this Example 1 and on meat-like foodstuffs made therefrom are shown in comparison with those obtained by the conventional method in Table 1. As obviously understood from Table 1, the fibers according to the present invention are significantly superior in chewiness and flavor compared with those obtained by the conventional method.

Table 1

Comparison of properties of fibers and organoleptic tests on meat-like foodstuffs.

| Type of fibers | Elongation of fibers,% 2) | Organoleptic tests 3) | |
| --- | --- | --- | --- |
| | | Meat-like chewiness acceptable | Taste good |
| Fibers according to Example 1 | 600 | Nineteen persons | Twenty persons |
| Fibers according to the conventional method 1) | 180 | One person | 0 |
| | | Panel member: twenty persons | |

1) Temperature of coagulation and neutralization: 25°C, Drawing Tension : 100%, Neutralizing agent : sodium hydroxide. Other conditions as to the formulation of spinning dope, diameter of nozzle, composition of coagulating bath and the like are the same as those in Example 1.
2) Indicated by an elongation at the time filaments of 5cm in length are drawn out to break down.
3) The tests were carried out on meat-like foodstuffs obtained by impregnating 100 parts of protein fibers (30% in solids) with a mixed solution of 20 parts of water, 15 parts of sodium chloride, 0.4 parts of neutral salt of phosphoric acid and 0.4 parts of sodium glutamate and heating at a temperature of 90°C for 20 minutes.

EXAMPLE 2

Protein fibers are prepared according to the same procedure as Example 1 except that the temperature of the coagulating bath is 8°C, the drafting or drawing tension is 180 percent and a suspension of calcium carbonate having a temperature of 60°C is used as the neutralizing bath.

The pH of the so obtained fibers is 6.4 evenly between fiber tows and in the inside of the fibers and the elongation thereof is 320 percent, and accordingly the fibers are superior in the chewiness and flavor.

What is claimed is:

1. In the process for the preparation of edible protein fibers wherein spinning dope is produced from an alkali-peptized solution of soybean protein and said spinning dope is extruded through fine holes into an acid-salt coagulating bath and the resulting fibers are neutralized, the improvement which comprises spinning said dope in a coagulating bath having a temperature of not more than about 10°C and subjecting the spinning dope to drawing tension of at least about 150 percent, and neutralizing the resulting spun fibers with hot water at a temperature above 60°C containing a buffer agent whose buffer action is in the range of pH from about 5.0 to about 6.5 or with an aqueous suspension of an alkaline salt slightly soluble or insoluble in water.

2. A process according to claim 1, wherein said alkaline salt which is slightly soluble in water is calcium carbonate.

3. A process according to claim 1 wherein said buffer agent is a member selected from the group consisting of citric acid-sodium citrate, acetic acid-sodium acetate and phosphoric acid-sodium phosphate.

* * * * *